United States Patent
Serhan

(10) Patent No.: US 7,052,030 B2
(45) Date of Patent: May 30, 2006

(54) WHEELED WALKER

(75) Inventor: Michael Serhan, Arcadia, CA (US)

(73) Assignee: Medical Depot, Port Washington, NY (US)

( * ) Notice: Subject to any disclaimer, the term of this patent is extended or adjusted under 35 U.S.C. 154(b) by 121 days.

(21) Appl. No.: 10/613,402

(22) Filed: Jul. 2, 2003

(65) Prior Publication Data

US 2005/0001398 A1     Jan. 6, 2005

(51) Int. Cl.
    A61G 5/08    (2006.01)

(52) U.S. Cl. .............. 280/304.1; 280/647; 280/87.041; 297/DIG. 4

(58) Field of Classification Search ............. 280/304.1, 280/647, 648, 650, 47.34, 47.37, 47.38, 87.041; 135/66, 67; 297/DIG. 4; 272/70.4; D12/130
    See application file for complete search history.

(56) References Cited

U.S. PATENT DOCUMENTS

| 1,448,783 | A |   | 3/1923  | Blewitt et al. |           |
|-----------|---|---|---------|----------------|-----------|
| 2,866,495 | A |   | 12/1958 | Diehl et al.   |           |
| 4,211,309 | A |   | 7/1980  | Ruggiero       |           |
| 4,341,381 | A |   | 7/1982  | Norberg        |           |
| 4,907,794 | A |   | 3/1990  | Rose           |           |
| 5,224,731 | A |   | 7/1993  | Johnson        |           |
| D360,174  | S |   | 7/1995  | Kjell et al.   |           |
| 5,451,193 | A | * | 9/1995  | Pickard        | 482/68    |
| 5,462,380 | A | * | 10/1995 | Peek et al.    | 403/329   |
| D367,251  | S | * | 2/1996  | Ahlberg et al. | D12/129   |
| 5,496,050 | A |   | 3/1996  | Geiger et al.  |           |
| 5,558,358 | A |   | 9/1996  | Johnson        |           |
| 5,560,636 | A |   | 10/1996 | Chen           |           |
| 5,590,974 | A | * | 1/1997  | Yang           | 403/327   |
| 5,603,517 | A |   | 2/1997  | Lorman         |           |
| 5,716,063 | A |   | 2/1998  | Doyle et al.   |           |
| 5,741,020 | A |   | 4/1998  | Harroun        |           |
| 5,758,897 | A |   | 6/1998  | Kueschall      |           |
| 5,772,234 | A | * | 6/1998  | Luo            | 280/642   |
| D396,437  | S | * | 7/1998  | Liljedahl      | D12/130   |
| 5,816,593 | A | * | 10/1998 | Che            | 280/87.041|
| 5,857,688 | A |   | 1/1999  | Swearingen     |           |
| 5,865,065 | A |   | 2/1999  | Chiu           |           |
| 5,878,625 | A |   | 3/1999  | Hu             |           |
| 5,887,887 | A |   | 3/1999  | Keuning        |           |
| 5,915,712 | A | * | 6/1999  | Stephenson et al. | 280/304.1 |

(Continued)

Primary Examiner—Christopher P. Ellis
Assistant Examiner—Christopher Bottorff
(74) Attorney, Agent, or Firm—Wolff & Samson

(57) ABSTRACT

A wheeled walker with wheels that are at least seven inches in diameter while having a seat with its top surface less than 20 inches high and accommodating a full size basket by using an inverted "u" shaped lower cross member with spacers that cushion the basket. Spacers carried on a rear upper cross member cushion the seat. The basket includes a pair of opposing vertical wires of substantially greater thickness than adjacent vertical metal wires and which extend upwardly into hooks that support the basket on a front upper cross member. A tubular seat back bears a tubular cushion having a radius of curvature such that the rearmost depth is about 3 to 8 inches, preferably 4 to 7 inches, most preferably 6½ inches, and the arc angle is about 110 to 120 degrees, preferably about 112 to 116 degrees, most preferably about 114 degrees. The tubular seat back is carried on tubular members received in respective opposing tubular receptors, each having an aperture receiving a latch locking the seat back to front legs of the wheeled walker that is spring loaded to jut from the aperture and which is connected by a lever to a release button jutting from another aperture.

16 Claims, 5 Drawing Sheets

U.S. PATENT DOCUMENTS

| | | |
|---|---|---|
| 6,079,290 A | 6/2000 | Li |
| 6,135,475 A | 10/2000 | Brown et al. |
| 6,241,275 B1 | 6/2001 | Slagerman |
| 6,311,708 B1 * | 11/2001 | Howle .................. 135/67 |
| 6,318,392 B1 * | 11/2001 | Chen .................... 135/67 |
| 6,338,355 B1 | 1/2002 | Cheng |
| 6,338,493 B1 | 1/2002 | Wohlgemuth et al. |
| 6,378,883 B1 * | 4/2002 | Epstein ............... 280/250.1 |
| 6,481,730 B1 * | 11/2002 | Sung .................. 280/87.05 |
| 6,494,469 B1 * | 12/2002 | Hara et al. ........... 280/87.041 |
| D481,336 S * | 10/2003 | Wu ..................... D12/130 |
| 6,651,994 B1 * | 11/2003 | Hallgrimsson et al. 280/87.041 |
| 6,659,478 B1 * | 12/2003 | Hallgrimsson et al. .. 280/47.36 |
| 6,688,633 B1 * | 2/2004 | van't Schip ............ 280/642 |
| 6,837,503 B1 * | 1/2005 | Chen et al. ........... 280/87.021 |
| 2002/0070533 A1 * | 6/2002 | Owens |

* cited by examiner

WHEELED WALKER

FIELD OF THE INVENTION

The field of the invention includes wheeled walkers or rollators.

BACKGROUND OF THE INVENTION

A wheeled walker, also called a rollator is in effect a walker with wheels. It combines a walking frame, the handles of which are usually adjustable in height, and is fitted with tire wheels so that rather than lifting the walker to move, the user just pushes it. Even early walkers were equipped with some mechanism for allowing the user to sit when desired; see U.S. Pat. No. 1,448,783 issued in 1921. Improvements have been made over the years including the ability to fold a walker, either down its center, as in U.S. Pat. Nos. 2,666,495 and 5,224,731 or in more modern versions by lifting the seat, and folding front to back, in U.S. Design Pat. No. 360,174, and in U.S. Pat. No. 5,865,065, particularly in FIG. 9 thereof. Examples of early frames, which in function are still used in the modern wheeled walkers, are found in U.S. Pat. Nos. 4,211,309 and in 4,341,381, the latter patent using the expedient of fixed wheels on the rear posts of the frame and casters on the front posts of the frame carrying wheels which are swiveled. A particularly relevant prior art rollator is depicted in FIG. 9 of U.S. Pat. No. 5,865,065 which describes the use of hand breaks that can be lifted to stop the wheeled walker momentarily or can be pushed downwardly to lock the wheeled walker in place.

The wheeled walker of U.S. Pat. No. 5,865,065 has certain dimensions which have been widely adopted in other walkers, although with some exceptions. As is typical of other wheeled walkers, it is equipped with a basket that lies beneath the seat, is at a height of 21½", and uses 6" wheels. Larger wheels, such as 8" wheels, are much more desirable in that they provide a sturdier, more manuverable walker. It is also desirable to provide a lower seat, significantly lower than 21½", but still accommodate the ability to place a full size basket so that it fits at least partially under the seat. Some available walkers do have 8" wheels and do have lower seats but none have a combination thereof wherein a full size basket can be placed under the seat. For example, a variety of walkers are available at the web site www.scooterville.net which illustrate the variations obtainable. The "Traveler" 4900 shown at that site is a 3-wheel walker with 8" wheels, though with no seat. The "Cruiser Deluxe Junior" has a seat height of only 18", but with 6" wheels. The "Mac" has 8" wheels, but a 22" seat height. The "Discovery" has 8" wheels and a seat height between 20 and 22".

A deficiency of the modern rollators is the strength of the baskets that are used with the rollator. The baskets are often hung from a section of the rollator and the mechanism for hanging, which is often simply a wire hook, is often not as strong as needed to preserve the structure and integrity of the basket. In addition, many of the units are noisy, particularly where the basket and seat comes in contact with its respective support structure. Most modern wheeled walkers also come with a back against which the user can lean. These are either straight as shown in FIG. 9 of U.S. Pat. No. 5,965,065 or deep as shown by the "Discovery" wheeled walker or "Voyager" wheeled walker at the Scooterville.net web site, or in U.S. Pat. No. 1,448,783. Typically, prior curved backs have a radius of curvature such that the depth of the rearmost point measured from the start of curvature ("rearmost depth") is about 10 inches. If a line is drawn across the points of curvature of the opposing arms, the outside angle made with that line by a line drawn from the point of curvature to the center of the seat back ("arc angle") is about 134 degrees.

SUMMARY OF THE INVENTION

The present invention provides a wheeled walker that overcomes the foregoing deficiencies. The wheeled walker has wheels that are at least seven inches in diameter, preferably eight inches in diameter, while having a seat with its top surface less than 20 inches high, preferably 18 to 18½ inches high. There are advantages, particularly to older users of small stature to have a seat that is less than 20 inches high, in the 18 to 18½ inch range, but in order to accommodate such a low seat height, the manufacturers have had to limit the wheels to 6 inches or else lose the ability to place a full size basket under the seat, which can require that the lower support for the basket be 8 inches or more from the structure that supports the seat. The wheeled walker of this invention accommodates a full size basket by using an inverted "u" shaped lower cross member with spacers that cushion the basket. Spacers carried on a rear upper cross member cushion the seat. The basket includes a pair of opposing vertical wires of substantially greater thickness than adjacent vertical metal wires and which extend upwardly into hooks that support the basket on a front upper cross member.

In a further embodiment, a tubular seat back bears a tubular cushion having a radius of curvature such that the rearmost depth (as defined above) is about 3 to 8 inches, preferably 4 to 7 inches, most preferably 6½ inches, and the arc angle (also as defined above) is about 110 to 120 degrees, preferably about 112 to 116 degrees, most preferably about 114 degrees. The tubular seat back is carried on tubular members received in respective opposing tubular receptors and can be easily removed from the wheeled walker. Each receptor has an aperture receiving a latch locking the seat back to front legs of the wheeled walker the latch being spring loaded to jut from the aperture and connected by a lever to a release button jutting from another aperture.

DETAILED DESCRIPTION OF THE INVENTION

Figures 1, 2:
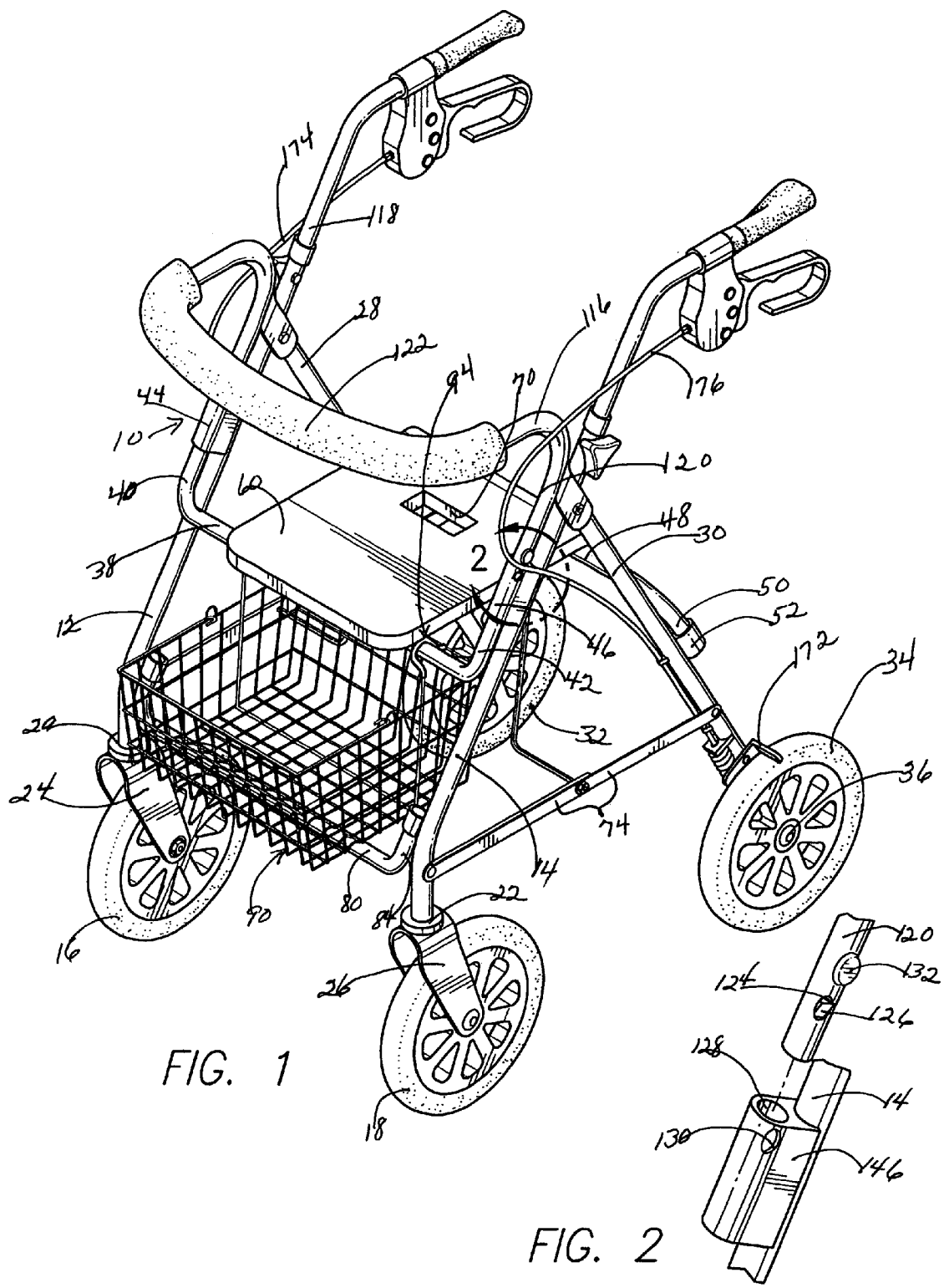
FIG. 1 is a front perspective view of a wheeled walker of the present invention.
FIG. 2 is an enlarged, exploded view of a seat back release mechanism of the wheeled walker of FIG. 1, taken in the region indicated by line 2 in FIG. 1.
Figure 3:
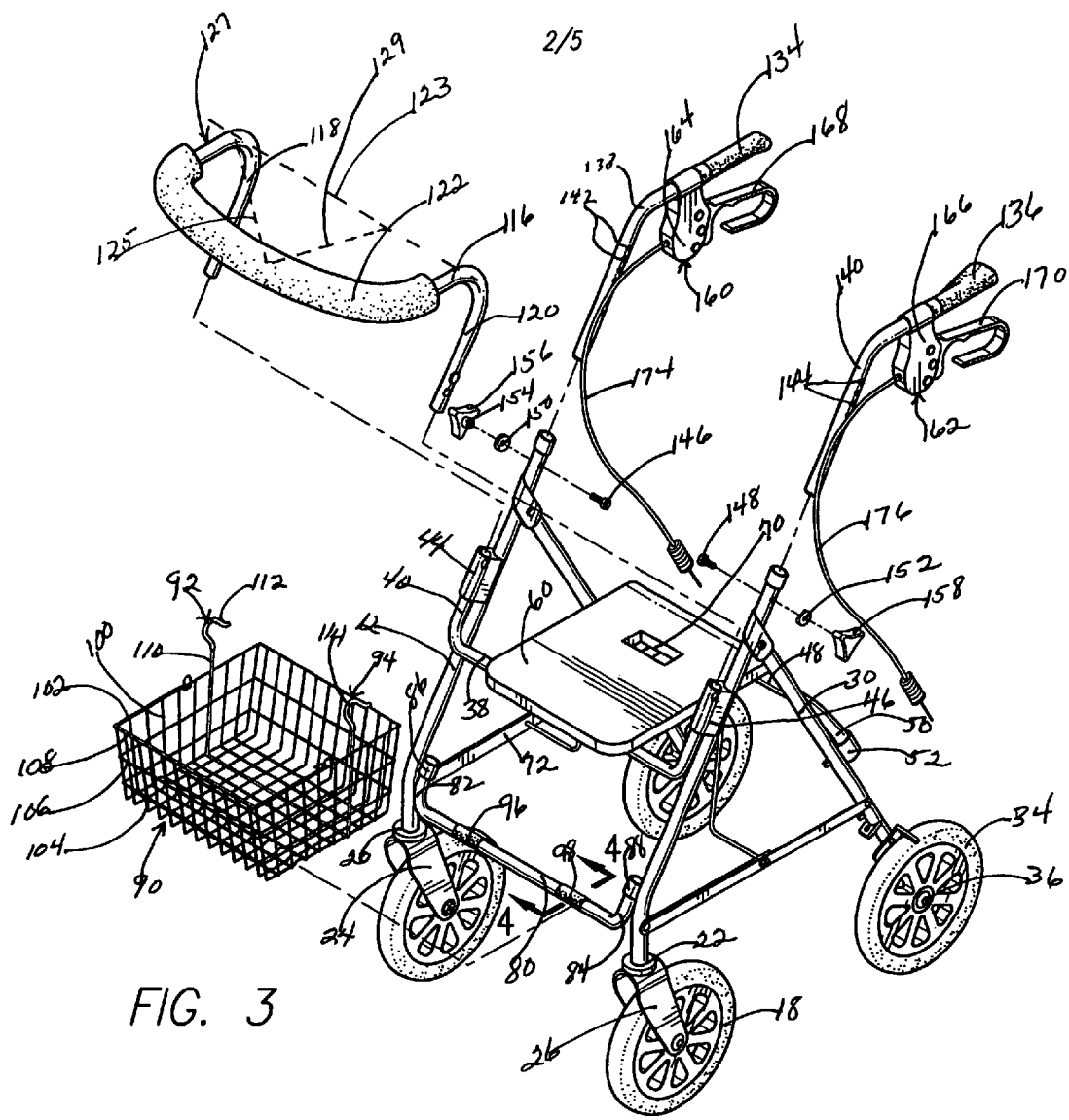
FIG. 3 is an exploded view of the wheeled walker of FIG. 1.
Figure 5:
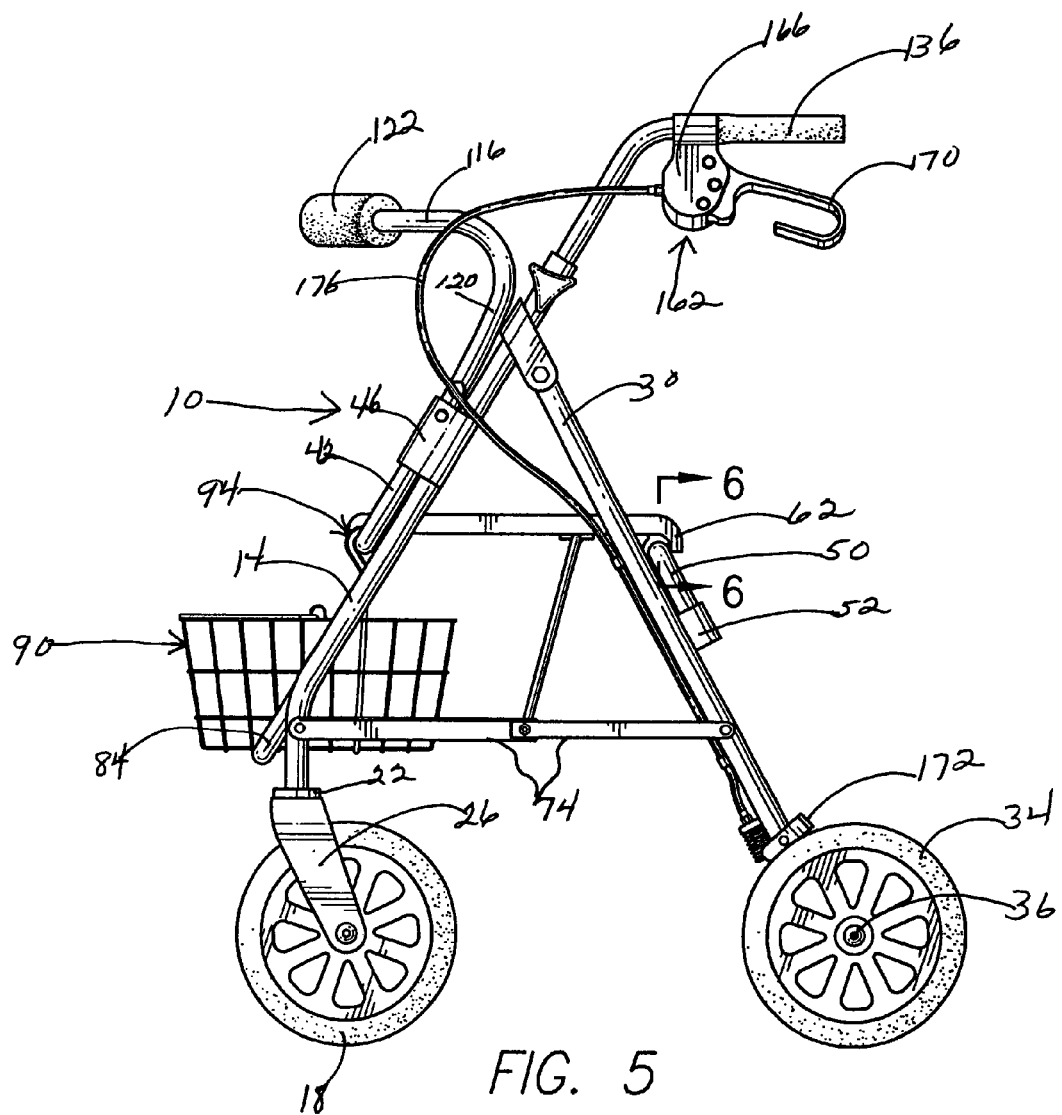
FIG. 5 is a side elevational view of the wheeled walker.

Referring to FIGS. 1, 3 and 5, a wheeled walker 10 is shown having a pair of forwardly diverging front legs 12 and 14 carrying front wheels 16 and 18 on their lower ends, connected by the rotary bearings 20 and 22 of casters 24 and 26 carrying the wheels 16 and 18. A pair of rearwardly diverging back legs 28 and 30 carries back wheels 32 and 34 on their lower ends which are fixed for non-swivel rotation to the back legs by axl essuch as at 36. An upper front cross tubular member 38 having an elongated u-shape is affixed by its upright arms 40 and 42 welded to respective bracket members 44 and 46, themselves welded to the front legs 12 and 14. A rear cross tubular member 48 having an elongated inverted U-shape has its lower arms, such as at 50, welded to brackets such as at 52 which are themselves welded to the rear legs 28 and 30. A seat 60 is pivotally connected by two tubular brackets (not shown) bolted to the underside of the seat 60 and straddling the tubular upper front cross member 38. The seat 60 is generally rectangular, approximately a square configuration, and is carried also by the tubular rear cross member 48.

Figure 6:
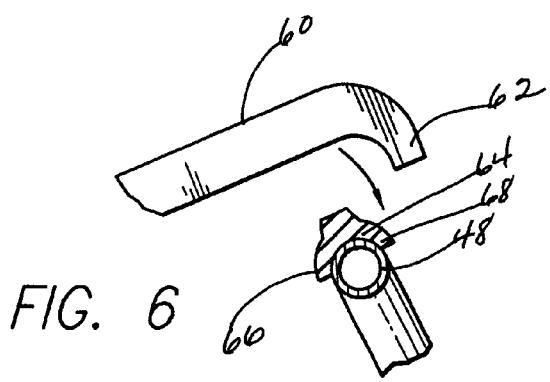
FIG. 6 is a partially exploded, partially cross-sectional view of a cushioning seat support of the wheeled walker, taken on line 6—6 of FIG. 5.

As shown more particularly in FIG. 5 and additionally referring to FIG. 6, the seat 60 is formed with a downwardly curving end wall 62 which bears against a pair of spacers 64, one of which is shown, carried on opposite horizontal regions of the tubular rear cross member 48. The spacers 64 are formed of hard rubber or plastic having sufficient give so that when the seat 62 abuts them a comfortable feel is provided to the user and on-metal friction and noise are eliminated. Referring particularly to FIG. 6, each spacer 64 is formed with a pair of gripping arms 66 and 68 that engage the tubular rear cross member 48. The seat is formed with a hand slot 70 spaced from the rear edge of the seat 60 but more so from the front edge of the seat 60 by which the user can lift the seat. Referring back to FIGS. 1, 3 and 5, a pair of hinged arms 72 and 74 span respective front and rear legs 12–28, and 14–30, connected thereto and connected at their centers by a crank 76 which is secured by a pair of u-shaped brackets 78 secured by screws to the underside of the seat 60. When the seat 60 is lifted, the crank pulls up the hinged arm 74 to fold the unit with the front legs 12 and 14 and the rear legs 28 and 30 moving toward each other.

Figure 4:
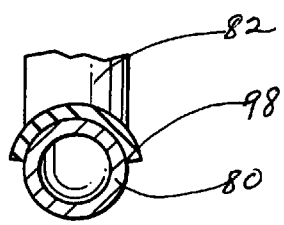
FIG. 4 is a cross-sectional view of the lower cross member of the wheeled walker, taken on line 4—4 of FIG. 3.

A lower tubular cross member 80 having an elongate u-shape has its upwardly directed arms 82 and 84 welded to brackets 86 and 88 which are themselves welded to the lower portions of the from legs 12 and 14. A wire basket 90 has hooks 92 and 94 that extend upwardly on opposite sides of the basket 90, and which hang the basket 90 from the upper tubular front cross member 38 so as to be supported by the lower tubular cross member 80. Referring particularly to FIG. 3 and additionally to FIG. 4, a pair of elongate, c-shaped cushioning members 96 and 98 girdle the lower tubular cross member 80 on opposite sides of the lower tubular cross member 80 and is formed of a hard rubber or plastic but sufficiently soft to cushion the basket 90 and prevent scraping noises when the wheel walker is moved.

As shown more clearly in FIG. 3, the basket 90 is formed of strands of metal wires 100 crossing each other and welded at cross points. A handle 102 is connected to the upper edge of the basket. The basket 90 is encircled horizontally by three wire strands 104, 106 and 108 each having a thickness of approximately twice that of the vertical strands 100, the top wire strand 108 forming the top edge of the basket. In accordance with one aspect of the invention one of the vertical cross strands 110 about two thirds toward the back of the basket, is formed also of wire that is about twice the thickness of the cross-strands 100 and extends upwardly from the top wire strand 108 on each side of the basket 90 to form the two hooks 92 and 94, which are covered by plastic sheathing 112 and 114. By forming the hooks as a continuation of the basket wire strands but of double thickness with respect to the other vertical strands, a more durable basket connector is enabled.

A tubular seat back 116 is provided which is horizontally curved and formed with a pair of opposing downwardly directed legs 118 and 120. The seat back 116 is curved horizontally and fitted with a cylindrical cushion 122 of foam plastic, such as polyurethane, which is sufficiently pliable to provide comfortable support. Referring particularly to FIG. 3, a bridging line 123 is drawn across the points of curvature of the opposing arms. The outside angle made with the bridging line 123 by a line 125 drawn from the point of curvature to the center of the seat back can be referred to as the "arc angle" 127. The length of a line drawn from the center of the bridging line 123 to the center of the seat back cushion 122 can be referred to as the "rearmost depth" 129 of the seat back. In accordance with a further embodiment of this invention, the seat back and cushion member have a rearmost depth of about 4 to 7 inches, preferably 6½ inches, and the arc angle is about 110 to 120 degrees, preferably about 112 to 116 degrees, most preferably about 114 degrees. Prior art seat backs are either flat or much more deeply curved. It is found that the foregoing curvature range provides a degree of comfort not experienced any of the prior art seat backs.

In accordance with another embodiment of the invention, the tubular seat back 116 can be readily removed from the wheeled walker. To accomplish this, the bracket members 44 and 46 on the respective front legs 12 and 14 define tubular receptors for receiving the ends of the opposing downwardly directed seat back legs 118 and 120. As shown more particularly in FIG. 2, each of the opposing downwardly directed legs 118 and 120 have an aperture as at 124 adjacent its end and a lock and release member 126 spring loaded to jut from the aperture 124. The opposing bracket members have receiving apertures 130 as at 128 to receive the respective jutting latch 126 to lock the seat back 116 to the front legs 12 and 14. Each of the downwardly directed tubular legs 118 and 120 are formed with another aperture below a button 132 (hidden in FIG. 2) spaced upwardly from the first aperture. The lock and release member 126 is formed with a lever connected to the latch at one end and protruding from the other aperture at its other end, with the button 132 connected the protruding lever. Pressing the button 132 releases the latch 126 from its respective receptor. The seat back 116 can be readily and easily removed simply by depressing the button 132 on each side and lifting the seat back 116 from the wheeled walker 10. By such means, a folding of the wheeled walker 10 it can be easily placed in a car that might not accommodate the seat back. To replace the seat back 116 on the wheeled walker 10, one simply has to insert its downwardly directed legs 118 and 120 in the bracket receptors 128 until the latches 126 snap into the receptor apertures 130.

The walker is formed with hand grips 134 and 136 carried respectively on upward and rearward extensions 138 and 140 of the front legs 12 and 14. The extensions 138 and 140 are separable from the front legs 12 and 14, fitting telescopically therein, and are formed with a plurality of apertures, such as at 142 and 144, which can be engaged at different height locations by respective bolts 146 and 148 retained by respective washers 150 and 152 and nuts such as at 154, each encased in large easily turned and generally triangularly shaped handles 156 and 158. Brakes 160 and 162 include frames 164 and 166 and control levers 168 and 170 control the movement of a shape edge brake mechanism 172 via transmission cables 174 and 176.

Figure 7:
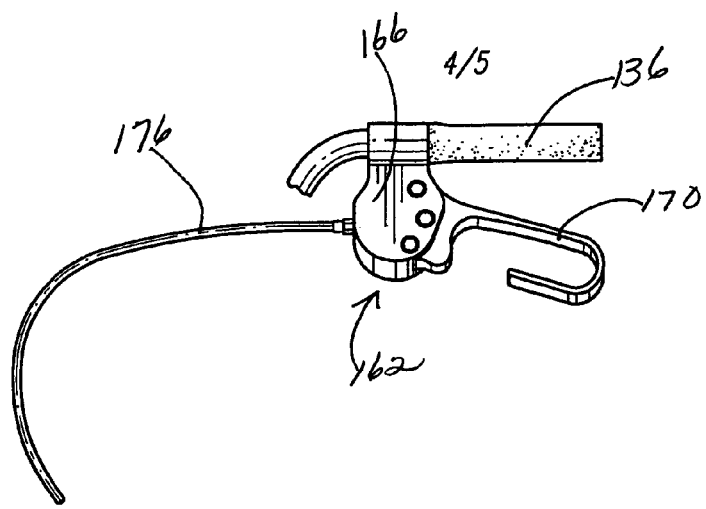
FIG. 7 is an elevational view of a brake and wheel subsystem of the wheeled walker, with the brake released.
Figure 8:
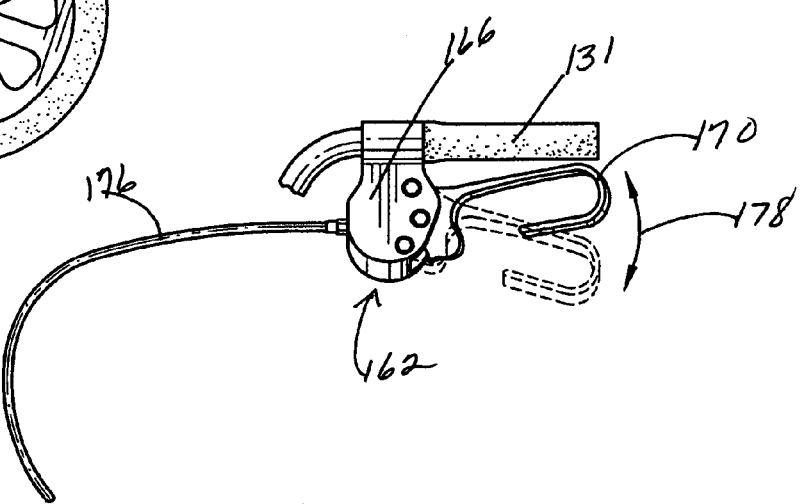
FIG. 8 is a view similar to that of FIG. 7, but showing the brake engaged by upward movement of the brake lever.
Figure 8:
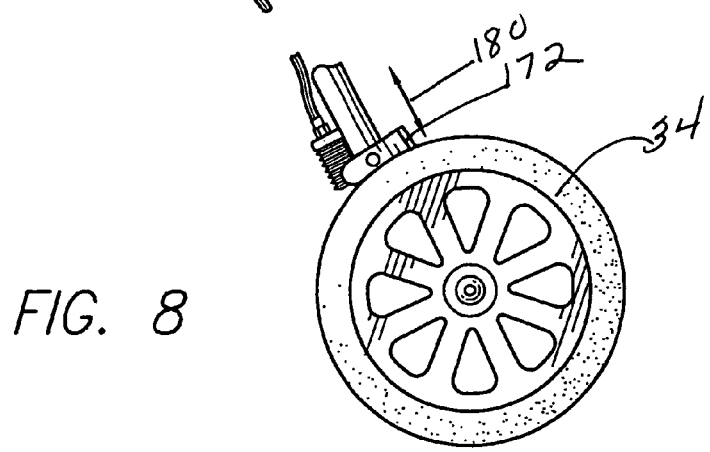
Figure 9:
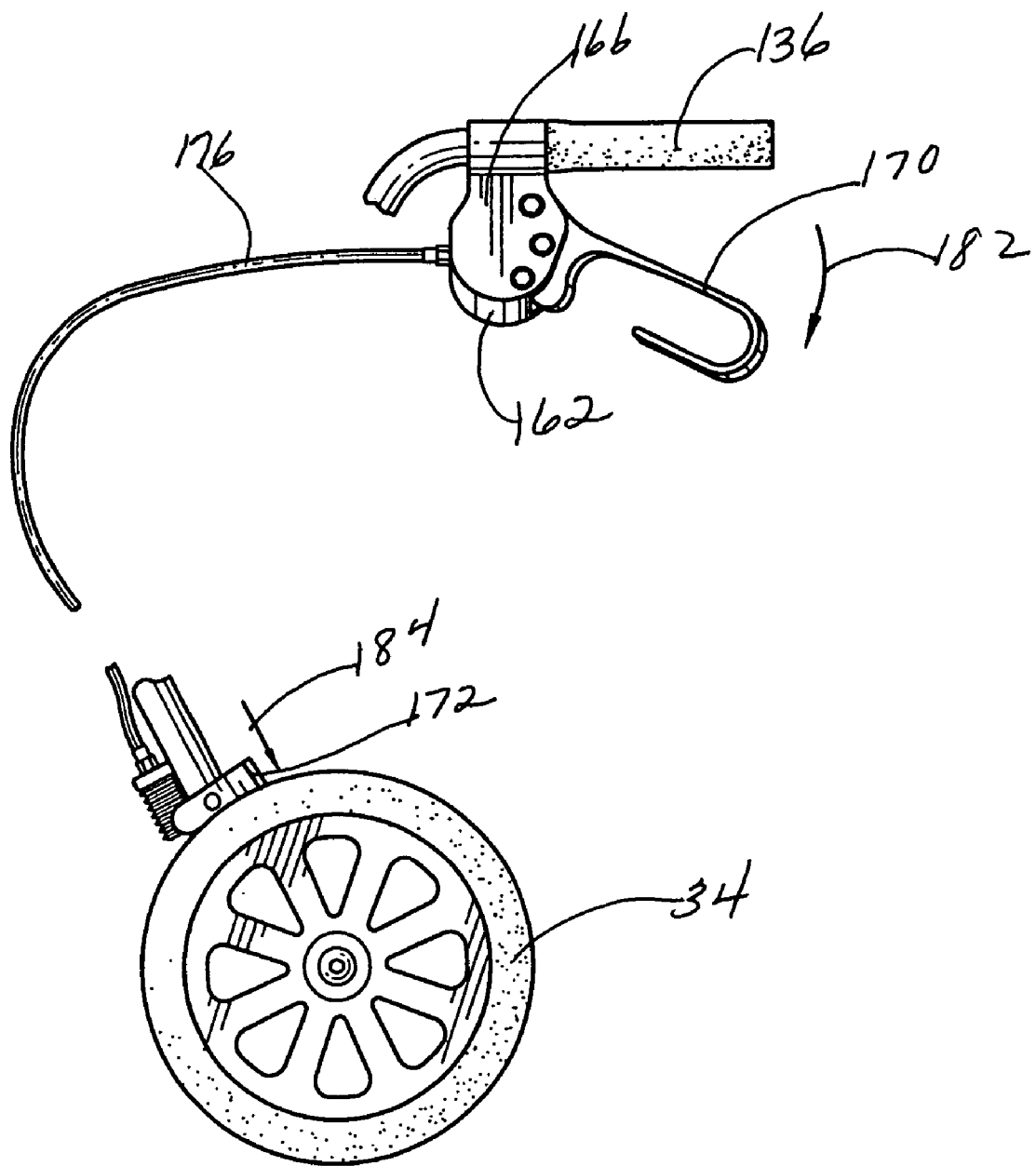
FIG. 9 is a view similar to that of FIG. 7, but showing the brake engaged by downward movement of the brake lever.

Operation of the brakes are shown at FIGS. 7, 8 and 9. The brake 162 shown in FIG. 7 is in a neutral position. When it is desired to put on the brakes when walking with the wheeled walker, one simply has to raise the control levers 168 and 170 whereupon the sharp edge brake mechanism 172 is caused to impinge upon the outer surface of the wheel 134.

Bringing the brake back to neutral, as indicated by the arrows 178 and 180 in FIG. 8, releases the brake. When it is desired to lock the brakes, for example, when sitting on the seat 60, one needs merely to push the control 170 downwardly whereupon internal mechanism in the brake frame 166 causes the brake to be locked in place on the wheel 34, as shown by the arrows 182 and 184.

In accordance with a significant embodiment of this invention, the wheels 16, 18, 32 and 34 are at least 7 inches in diameter and the top surface of the seat 60 is less than 20 inches high, i.e., less than 20 inches above the ground. Preferably the top surface is 18 inches to 18½ inches from the ground and the wheels are 8 inch wheels. Such a configuration has not been accomplished by the prior art because when using 8 inch wheels, the seat is a higher level. Otherwise the standard size basket, which is 6 inches high, 11½ inches wide and 13½ long would not be accommodated between the seat 60 and lower tubular cross member 80. In the prior art, the lower tubular cross members, when present, have an elongated inverted u-shape. In accordance with the present invention, the lower tubular cross member 80 have an elongated uninverted u-shape. This modification to prior art wheeled walkers allows the standard basket having a 6 inch depth to be accommodated between the lower tubular cross member 80 and the upper tubular front cross member 38, a distance of approximately 9 inches, thereby allowing the basket 90 to be seated in that space. These dimensions are unique in the art.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments described herein. As one of ordinary skill in art will readily appreciate from the disclosure of the present invention, constructions presently existing or later to be developed and perform substantially the same function or achieve substantially the same result as the corresponding embodiments described herein may be utilized according to the present invention. Accordingly, the appended claims are intended to include within their scope such manufacture.

The invention claimed is:

1. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high, in which said wheels are eight inches in diameter.

2. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high and wherein said walker has a lower cross member connecting the front legs adjacent the lower ends of the front legs, the lower cross member having an inverted "u" shape whereby a full size wheeled walker basket may be supported on the lower cross member and including a basket supported on the lower cross member including at least one spacer carried on said lower cross member formed of material softer than the material of said lower cross member whereby to provide cushioning support for said basket.

3. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high and wherein said walker has a lower cross member connecting the front legs adjacent the lower ends of the front legs, the lower cross member having an inverted "u" shape whereby a full size wheeled walker basket may be supported on the lower cross member and including a basket supported on the lower cross member in which the distance from the bottom of said basket to the upper cross member is at least eight inches.

4. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high in which said wheels are eight inches in diameter and the top surface of said seat is between 18 and 18½ inches in which the distance from the bottom of said basket to the upper cross member is nine inches.

5. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high including a basket formed from horizontal and vertical metal wires, a top horizontal metal wire defining the upper surface of said basket, a pair of opposing vertical wires extending upwardly from said upper surface and formed into hooks, the basket being supported via said hooks on the upper front cross member, said opposing vertical wires having substantially greater thickness than adjacent vertical metal wires forming said basket.

6. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high in which said seat is pivotally connected to one of the cross members on which it is carried and can be lifted from the other cross member on which it is carried, the other cross member including at least one spacer carried thereon formed of material softer than the material of the lower cross member whereby to provide cushioning support for the seat when it is lowered onto the other cross member.

7. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high in which said seat is pivotally connected to the upper front cross member and can be lifted from the rear cross member, the rear cross member including at least one spacer carried thereon of material softer than the material of the rear cross member whereby to provide cushioning support for the seat when it is lowered onto the rear cross member.

8. In a wheeled walker having a pair of front legs carrying front wheels on their lower ends, a pair of back legs carrying back wheels on their lower ends, an upper front cross member connecting the front legs, a rear cross member connecting the rear legs, and a seat carried by the upper front and rear cross members with the top surface of the seat at a predetermined height, the improvement wherein said wheels are at least seven inches in diameter and the top surface of said rear seat is less than 20 inches high including a tubular seat back bearing a tubular cushion member, said seat back and cushion member having a rearmost depth of about 3 to 8 inches and an arc angle of about 110 to 120 degrees.

9. The improvement of claim 8 in which said rearmost depth is about 4 to 7 inches, and the arc angle is about 112 to 116 degrees.

10. The improvement of claim 9 in which said rearmost depth is about 6½ inches and the arc angle is about 114 degrees.

11. A wheeled walker, comprising:
a pair of front legs carrying front wheels on their lower ends;
a pair of back legs carrying back wheels on their lower ends;
an upper front cross member connecting the front legs;
a rear cross member connecting the rear legs; a seat pivotally connected to the upper front cross member and carried by, but liftable from, the rear cross member; and
at least one spacer carried on the rear cross member formed of material softer than the material of the rear cross member whereby to provide cushioning support for the seat when it is lowered onto the rear cross member.

12. A wheeled walker, comprising:
a pair of front legs carrying front wheels on their lower ends;
a pair of back legs carrying back wheels on their lower ends;
an upper front cross member connecting the front legs;
a rear cross member connecting the rear legs;
a lower cross member connecting the front legs adjacent the lower ends of the front legs;
a basket supported on the lower cross member; and
at least one spacer carried on said lower cross member formed of material softer than the material of said lower cross member whereby to provide cushioning support for said basket.

13. A wheeled walker, comprising: a pair of front legs carrying front wheels on their lower ends; a pair of back legs carrying back-wheels on their lower ends; and a tubular seat back bearing a tubular cushion member, said seat back and cushion member having a rearmost depth of about 3 to 8 inches and an arc angle of about 110 to 120 degrees.

14. The improvement of claim 13 in which said rearmost depth is about 4 to 7 inches, and the arc angle is about 112 to 116 degrees.

15. The improvement of claim 14 in which said rearmost depth is about 6½ inches and the arc angle is about 114 degrees.

16. A wheeled walker, comprising:
a pair of forwardly diverging front legs carrying eight inch diameter front swivel wheels on their lower ends;
a pair of rearwardly diverging back legs carrying eight inch diameter back wheels on their lower ends; an upper front cross member connecting the front legs; a rear cross member connecting the rear legs;
a seat pivotally connected to the upper front cross member and carried by, but liftable from, the rear cross member;
at least one spacer carried on the rear cross member formed of material softer than the material of the rear cross member whereby to provide cushioning support for the seat when it is lowered onto the rear cross member, the top surface of the seat being between 18 and 18½ inches high;
a lower cross member connecting the front legs adjacent the lower ends of the front legs, the lower cross member having an inverted "u" shape;
a basket supported on the lower cross member formed from horizontal and vertical metal wires, a top horizontal metal wire defining the upper surface of said basket, a pair of opposing vertical wires extending upwardly from said upper surface and formed into hooks the basket being supported via said hooks on the upper front cross member, said opposing vertical wires having substantially greater thickness than adjacent vertical metal wires forming said basket;
at least one spacer carried on said lower cross member formed of material softer than the material of said lower cross member whereby to provide cushioning support for said basket, the distance from the bottom of said basket to the upper cross member being at least eight inches; and
a tubular seat back bearing a tubular cushion member, said seat back and cushion member having a rearmost depth of about 6½ inches and an arc angle of about 114 degrees, said tubular seat back being formed with a pair of opposing downwardly directed tubular members, the front legs formed with respective opposing tubular receptors for receiving the ends of said opposing members whereby to support said seat back, each of said opposing members having a first aperture adjacent its end and a lock and release member having a latch spring loaded to jut from the first aperture, said opposing receptors having receiving apertures to receive respective jutting latch to lock the seat back to the front legs, each of said downwardly directed tubular members being formed with a second aperture spaced upwardly from said first aperture, said lock and release member being formed with a lever connected to said latch at one end and protruding from said second aperture at its other end, and a button connected to said protruding lever end whereby depressing said button releases the latch from its respective receptor.

* * * * *